(12) United States Patent
Kettley et al.

(10) Patent No.: US 8,584,083 B2
(45) Date of Patent: *Nov. 12, 2013

(54) SOFTWARE APPLICATION RECREATION

(75) Inventors: Paul Kettley, Winchester (GB); Ian J. Mitchell, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/445,603

(22) Filed: Apr. 12, 2012

(65) Prior Publication Data

US 2012/0204156 A1    Aug. 9, 2012

Related U.S. Application Data

(63) Continuation of application No. 12/538,366, filed on Aug. 10, 2009, now Pat. No. 8,352,907.

(51) Int. Cl.
  *G06F 9/44* (2006.01)
  *G06F 9/45* (2006.01)

(52) U.S. Cl.
  USPC ........... 717/106; 717/107; 717/108; 717/120; 717/121; 717/127; 717/128; 717/129; 717/131; 717/132; 717/168; 717/169

(58) Field of Classification Search
  None
  See application file for complete search history.

(56) References Cited

U.S. PATENT DOCUMENTS

| | | | | |
|---|---|---|---|---|
| 4,819,233 A * | 4/1989 | Delucia et al. | ................ | 717/129 |
| 5,642,472 A | 6/1997 | Cohen | | |
| 6,057,839 A * | 5/2000 | Advani et al. | ................ | 715/784 |
| 6,085,029 A * | 7/2000 | Kolawa et al. | ............. | 714/38.13 |
| 6,202,199 B1 * | 3/2001 | Wygodny et al. | ............. | 717/125 |
| 6,336,215 B1 * | 1/2002 | Oberhauser et al. | .......... | 717/129 |
| 6,611,955 B1 * | 8/2003 | Logean et al. | ................ | 717/128 |
| 6,804,814 B1 * | 10/2004 | Ayers et al. | ................... | 717/135 |
| 6,971,092 B1 * | 11/2005 | Chilimbi | ....................... | 717/158 |
| 6,988,263 B1 * | 1/2006 | Hussain et al. | ............... | 717/128 |
| 7,207,035 B2 * | 4/2007 | Kobrosly et al. | ............. | 717/128 |
| 7,543,279 B2 * | 6/2009 | Ayers et al. | ................... | 717/135 |
| 7,644,319 B2 * | 1/2010 | Thekkath | ........................ | 714/45 |
| 7,698,602 B2 * | 4/2010 | McFadden et al. | ............ | 714/45 |
| 8,132,159 B1 * | 3/2012 | Lindahl et al. | ................ | 717/128 |

(Continued)

OTHER PUBLICATIONS

Mesnier, M., "Trace: Parallel Trace Replay with Approximate Causal Events" Dec. 22, 2006, pp. 1-3, USENIX, United States, downloaded at www.usenix.org/events/fast07/tech/full_papers/mesnier/mesnier_html/node1.html.

(Continued)

*Primary Examiner* — Henry Tsai
*Assistant Examiner* — Jing-Yih Shyu
(74) *Attorney, Agent, or Firm* — Kenneth L. Sherman, Esq.; Michael Zarrabian, Esq.; Sherman & Zarrabian LLP

(57) ABSTRACT

A software application recreation in a computing environment is provided. One embodiment involves analyzing program execution trace data of a software application, and using the analysis results in recreating an executable version of the software application from data traced at significant points during the software application execution. Recreating an executable version of the software application involves creating white space code to simulate the software application execution timing by replacing business logic code of the software application with white space code in the recreated executable version. The recreated executable version of the software application programmatically behaves essentially similarly to the software application.

6 Claims, 4 Drawing Sheets

(56) References Cited

U.S. PATENT DOCUMENTS

| | | | |
|---|---|---|---|
| 8,136,096 B1* | 3/2012 | Lindahl et al. | 717/129 |
| 2005/0091644 A1* | 4/2005 | Chilimbi | 717/128 |
| 2005/0283676 A1* | 12/2005 | Begg et al. | 714/38 |
| 2006/0242627 A1* | 10/2006 | Wygodny et al. | 717/128 |
| 2009/0083715 A1* | 3/2009 | DeWitt et al. | 717/128 |

OTHER PUBLICATIONS

Zhu, N. et al., "TBBT: Scalable and Accurate Trace Replay for File Server Evaluation," Jun. 2005, pp. 1-14, ECSL, United States, downloaded at http://www.ecsl.cs.sunysb.edu/tr/TR184.pdf.

Arts, T. et al., "Trace Analysis of Erlang Programs," ACM SIGPLAN Erlang Workshop '02 Pittsburg, pp. 18-24, ACM United States, downloaded at www.erlang.se/workshop/2002/fredlund.pdf.

Raza, A. et al., "Bauhaus: a Tool Suite for Program Analysis and Reverse Engineering," Reliable Software Technologies—ADA-Europe 2006, Lecture Notes in Computer Science, 2006, pp. 71-82, vol. 4006/2006, BauhausStuttgart, Germany, downloaded at http://www.bauhaus-stuttgart.de/bauhaus/papers/bauhaus.pdf.

Ulrich, A., et al., "Reverse Engineering Models from Traces to Validate Distributed Systems—An Industrial Case Study," in Proceedings of the Third European Conference on Model Driven Architecture—Foundations and Applications (ECMDA-FA 2007), LNCS 4530, Jun. 11-15, 2007, pp. 184-193, Germany.

U.S. Non-Final Office Action for Application U.S. Appl. No. 12/538,366 mailed Apr. 25, 2012.

U.S. Notice of Allowance for Application U.S. Appl. No. 12/538,366 mailed Aug. 31, 2012.

* cited by examiner

SOFTWARE APPLICATION RECREATION

CROSS-REFERENCE TO RELATED APPLICATIONS

This patent application is a continuation patent application of U.S. patent application Ser. No. 12/538,366, filed on Aug. 10, 2009, the disclosure of which is incorporated herein its entirety by reference.

BACKGROUND

1. Field of the Invention

The invention relates generally to software service and in particular to software application recreation.

2. Background Information

In software service and software testing, a typical problem faced by a product service team involves recreating a customer problem scenario. In one case, a user encounters a failing scenario (e.g., an undocumented or incorrect behavior) in a software application. The user raises a problem and gathers documentation that may help a service team in diagnosis of the failing scenario. The service team examines the documentation to diagnose the problem. If the service team can diagnose the problem, then the service team can repair the problem in the software application and retest for the failing scenario.

If the service team cannot diagnose the problem, the service team may ask the user to execute the software application with additional diagnostic aids active, in order to gather additional information if the failing scenario recurs. Once the additional information is gathered, then the service team can repair the problem and retest for the failing scenario.

A common issue is properly retesting for the failing scenario. One option involves obtaining the failing software application from the user for testing. Another option involves asking the customer to perform testing using the repaired version of the software application. Yet another option involves creating a test program that simulates the behavior of the failing user software application. Such options may be problematic, however, when dealing with users running complex software applications.

In another case, a product service team attempts to test a new version of a software application against well known user software application failing scenarios. The service team needs to understand the implementation and behavior of user software applications in order to verify test scenarios. This may involve highly experienced professionals in the area being tested, who may study and manually produce a test version of the user application, may obtain the user application for use in their test environment, or may use tooling to assemble a realistic model of the user application. Such options remain problematic in terms of creating a realistic simulation of the actual user application.

BRIEF SUMMARY

The invention provides for software application recreation. An embodiment of the invention comprises a software application recreation process in a computing environment, including: analyzing program execution trace data of a software application; and using the analysis results in recreating a simulated executable version of the original software application from data traced at significant points during the software application execution, wherein the simulated executable version of the software application programmatically behaves essentially similar to the original software application.

The process may further include generating program execution diagnostic trace data for a software application, wherein analyzing program execution trace of the software application further includes programmatically analyzing program execution trace of the first software application for significant operations. The process may further include detecting the actual time difference or processor consumption between the significant traced operations, from the trace data. Recreating an executable version of the software application may include creating white space code to simulate the software application execution timing within the recreated version of the software application. Creating white space code to simulate the software application execution timing may include replacing business logic code of the software application with white space code in the executable version based on the diagnostic trace analysis.

The process may further include: generating program execution diagnostic trace data for multiple software applications running essentially in parallel; analyzing program execution trace data of the software applications; and using the analysis results in recreating an executable version of each of the software application from data traced at significant points during execution of each software application.

These and other features, aspects and advantages of the present invention will become understood with reference to the following description, appended claims and accompanying figures.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1:
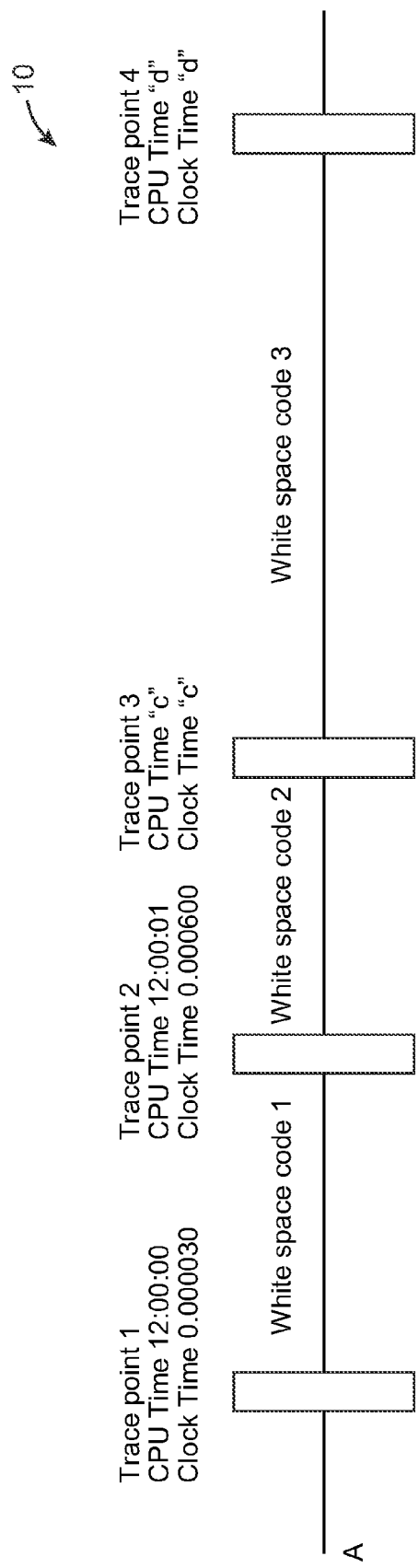
FIG. 1 shows a scenario for software application tracing and recreation, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides for analyzing trace information/execution points data for an original application in order to recreate an application (a set of instructions) that programmatically behave as closely (similarly) as possible to the original application. One embodiment involves programmatically analyzing a trace and recreating an executable version of the original application (user software application) from data traced at selected points during the execution of the original application, and recreating an application (a skeleton set of instructions) that programmatically behave as closely as possible to the original application. The selected points may comprise, for example, significant operations/points including predefined operations/points and/or selected operations/points types. The significant operations/points may be determined by an operator and/or machine. In the following examples, significant points are used as selected points.

One implementation involves recreating a program source code representing all the major interactions from an original software application (user software application) by reverse engineering the trace data. The recreation process involves recreation of the original software application from trace data by replacement of business logic code with white space code (soaker code) and creation of a skeleton application based on diagnostic trace information. The temporal behavior of the original software application often has critical effects on the system and must be accurately reflected in the simulated application. Using operating system dispatcher and timing functions to simulate the delays between the significant events in the application may not always be an accurate enough reflection of behavior of the original system. A more accurate simulation is to employ instructions that consume CPU and memory resources in a similar fashion to the original software application. Such instructions are termed "white space code" (since the code occupies the "white space" between the known trace points in the software application), and can be tuned to more accurately simulate the original software application (e.g., simply read memory and perform arithmetic, or write large amounts of data to memory, etc.).

A representation of the original software application is recreated by examining diagnostic trace information of the original software application. Business logic code is generally used to describe the functional algorithms which handle information exchange between a database and a user interface. Business logic code is distinguished from input/output data validation and product logic code. Business logic code is specific to a specific customer/user application and fundamentally separates e.g., company A from company B in information technology (IT) terms. Business logic may have features to differentiate a company from others that provide similar services.

When the software application executes, there are typically options to trace significant execution logic such that a service team can diagnose or understand the behavior of the application in the event of failure or other issues with the application. The trace captures information when an application calls functions of a software provider. Such information may include the type of call, the data involved, the parameters, the user identification, etc. Sufficient information is gathered to recreate a function call. If this were performed against a large amount of trace for the application, then all major interactions from the application can be recreated by reverse engineering the trace data.

A representation of the user application is determined by examination of diagnostic trace information. Performing the above process for a large number of traces for the user application allows recreation of essentially all major interactions from the application by reverse engineering the trace data. The invention provides the application code that executes between the significant execution points, for recreating the application. Recreating the main execution points allows detecting the "white space code" where less (or none) interesting/significant application logic executes. Identifying certain properties of the code running between the trace points allows creating a representation of the white space code as well.

The white space code can be varied in size to imitate the application behavior when there is only an instance of one application running or when there are multiple instances of the application running In a typical computing environment, the application generally executes more rapidly if there is one instance versus multiple instances executing in parallel. White space code substitutes for actual business logic code, but has no real purpose. White space code executes and takes actual execution time that is comparable to the time the actual business logic code would have taken to execute. While space code may comprise e.g. simple loops that have a known time duration that can be executed many times in order to consume elapsed time or processor (e.g., CPU) cycles.

FIG. 1 shows an example process 10 for application recreation from trace data with replacement of business logic code with white space code (soaker code) and creation of skeleton application based on diagnostic trace information, according to an embodiment of the invention. An application executes between point A and point B in its code (i.e., program instructions) for a time period. According to an embodiment of the invention, in that time period several significant operations are recorded (traced). An example of a significant operation may involve reading a specific record from a file or database (DB). The trace would contain the key information that was needed for the read request (e.g., information to identify the target file or DB and the key of the unit of information to be retrieved). These significant operations are described as trace points 1, 2, 3 and 4 in FIG. 1. The code that executes between said trace points is described as white space code 1, 2 and 3.

The main functions of the application are recorded at these trace points, which may be reverse engineered to recreate the significant parts of the application. A representation of the white space code may be recreated by analyzing information about the application captured at the trace points, such as:

At trace point 1:
  The current wall clock time is 12:00:00,
  The current processor (e.g., CPU) usage is 0.000030 cpu seconds (i.e., CPU utilization).
At trace point 2:
  The current wall clock time is 12:00:01,
  The current CPU usage is 0.000600 cpu seconds.

Accordingly, execution of the white space code 1, which is between trace point 1 and trace point 2, involves:
  1 second of elapsed (wall clock) time to execute,
  0.000570 cpu seconds to execute.

When the application is recreated, the above information can be used to rebuild the non-significant, white space code. When the application is reverse engineered and recreated, the above information may be used to generate appropriate white space logic/code to either consume the amount of CPU resources that were used in white space 1 (reproduce application with CPU as a consideration), or simply issue a wait for the elapsed wall clock time taken by white space 1 code (reproduce application with time as a consideration). Either of these behaviors is appropriate for a more accurate recreation of an application.

It should be noted that the intent is not to reproduce the original code, but to recreate alternative code that executes for an amount of time (elapsed or cpu) comparable to the original application. The recreation of the application with the ability to vary the length of execution time of the white space code execution provides flexibility for running test reconstructions of the application. The white space code behavior can be parameter driven to allow variations in the behavior.

Figure 2:
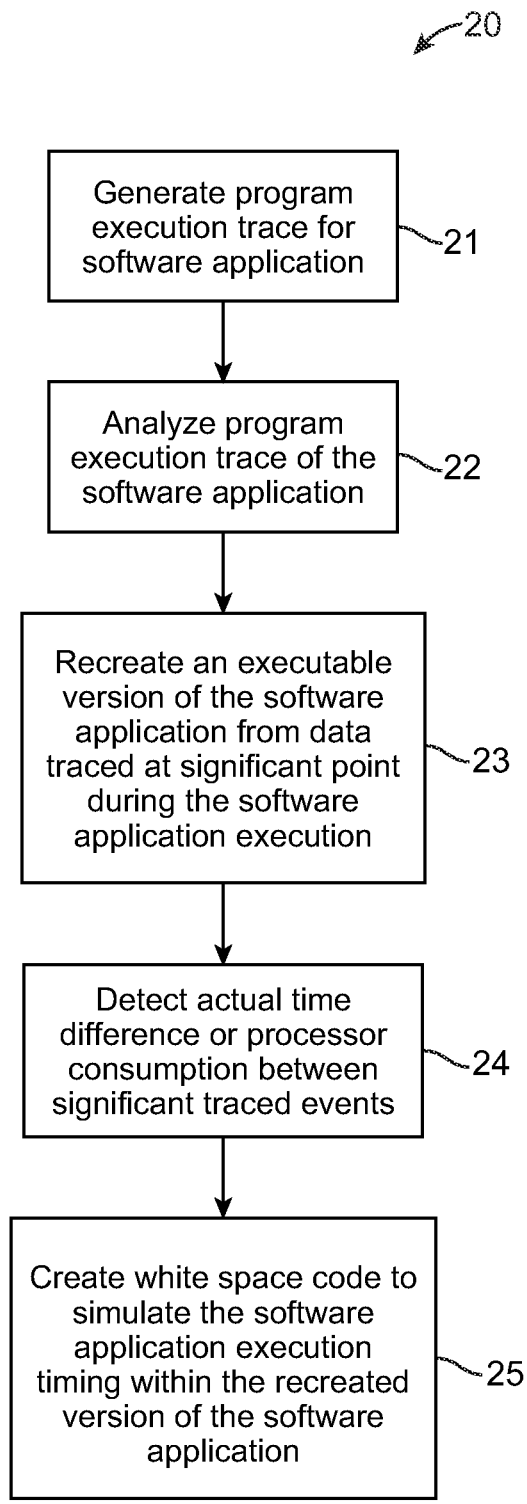
FIG. 2 shows flowchart of a process for software application tracing and recreation, according to an embodiment of the invention.

FIG. 2 shows a flowchart of a process 20 for application recreation from trace data with replacement of logic code with white space code and creation of a skeleton application based on diagnostic trace information. The process 20 includes:

- Block 21: Generating program execution diagnostic trace for a software application.
- Block 22: Programmatically analyzing program execution trace of the software application for significant operations. Programmatic analysis may involve e.g. using the trace data as the source input to a trace analysis program or trace formatter. The trace analysis will identify any significant events that need to be recreated as a part of recreating a test executable version of the original application. An example involves recognizing the trace information that represents the update of a record on a database. This may involve recognizing the trace identifier "Update DB", extracting the name of the DB and extracting all key values that are needed in order to execute the update request. Another example may involve spotting opening and closing files or DBs, spotting any activity to a file or DB, reading, browsing, updating, deleting, changing or execution userID, performing security checking or spotting the logical conclusion of an activity via the trace of a synchronization point or rollback request. Programmatically analyzing may involve an analyzer software module configured for analyzing program execution trace of the software application, as described herein.
- Block 23: Based on the analysis, recreating an executable version of the software application from data traced at significant points during the software application execution.
- Block 24: Detecting the actual time difference or processor consumption (i.e., CPU utilization) between the significant traced operations (events).
- Block 25: Creating white space code to stimulate the software application execution timing within the recreated version of the software application.

Figure 3:
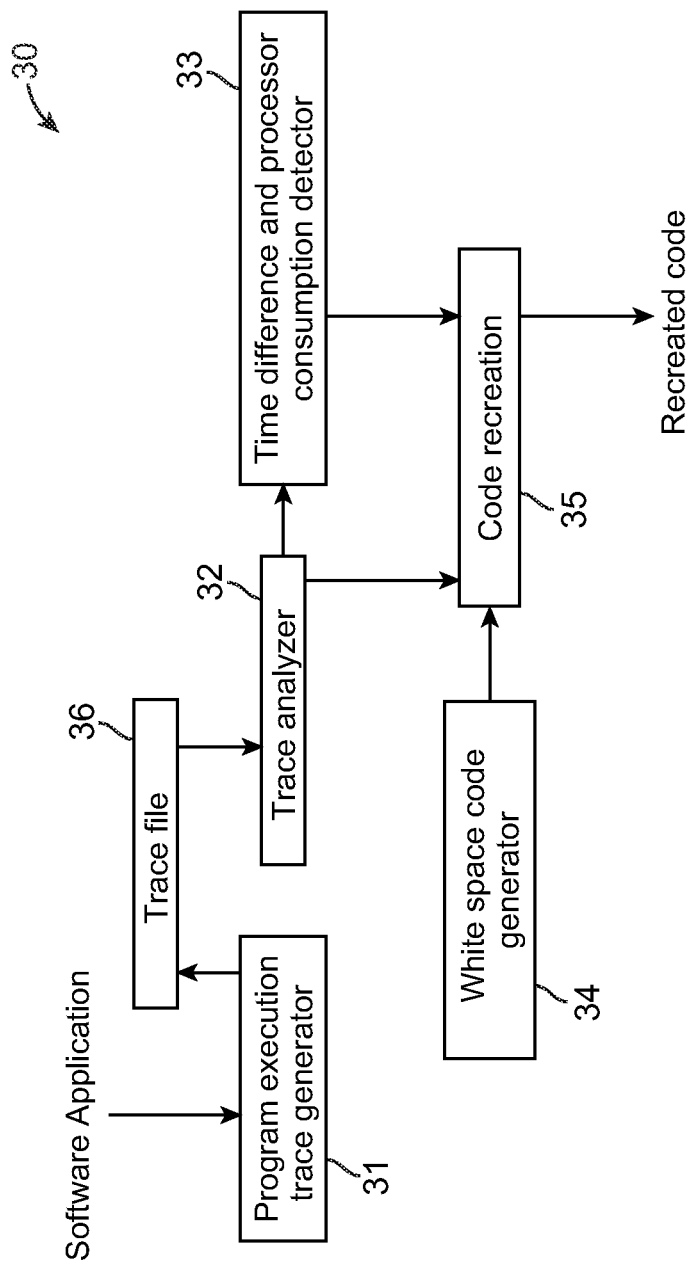
FIG. 3 shows a functional block diagram of a system for software application tracing and recreation, according to an embodiment of the invention.

FIG. 3 shows a functional block diagram of a system 30 for software application tracing and recreation, according to an embodiment of the invention. The system 30 includes a program execution trace generator 31 configured for generating program execution trace for a software application. The execution trace data may be stored in a trace facility including a trace file 36. The system 30 further includes a trace analyzer 32 configured for programmatically analyzing program execution trace of the first software application. The system 30 further includes time difference and processor consumption detector 33 configured for detecting the actual time difference or processor consumption between the significant traced events, based on said analysis. The system 30 further includes a white space code generator 34 configured for Creating white space code to simulate the software application execution timing within a recreated version of the software application. The system 30 further includes a code recreation module 35 configured for recreating an executable version of the software application from data traced at significant points during the software application execution, utilizing the white space code and detected actual time and processor consumption difference. The white space code generator 34 may be a component of the code recreation module 35.

In one embodiment, the invention is useful with software applications which provide application programming interfaces (APIs) such as e.g. transaction servers (e.g., IBM CICS transaction server) or messaging applications for distributed platforms providing connectivity (e.g., IBM WebSphere MQ). In one example involving the IBM WebSphere MQ (WMQ) software application, an application tracing function is enabled to have a target destination of a generalized trace facility (GTF). This means that the trace data is written to an external trace file. The software application executes trace active, hence capturing trace data which shows the execution flow of the software application. Then a code recreation system according to an embodiment of the invention (e.g., system 30 in FIG. 3) is executed against the WebSphere MQ trace data to convert all the significant trace data back into the corresponding WMQ API requests (reverse engineering). In WebSphere MQ terms, this would be the trace entries that best represented the WebSphere MQ verbs (e.g., MQOPEN, MQPUT, MQGET, MQCLOSE, etc.). The code recreation system provides an executable application comprising a recreated version of the original software application. The recreated application has all the WMQ verbs but none of the business logic, which would be desirable for creating test programs that exercised the WMQ logic in logical sequence as indicated by the original application. For tracing, WMQ trace can be used. Another option would be to augment WebSphere MQ (or other software applications) to write out the exact format of a given API command as a part of the tracing process. If this was written at the time of application execution, then this new data may be written to a new file, potentially with a new file for each application being traced hence separating the data at execution time.

The trace data can include diagnostic trace data from execution of multiple software applications, allowing recreating of multiple software application by analyzing the corresponding diagnostic trace data. In one example, diagnostic trace may include trace information relating to execution of multiple software applications that are running in parallel (e.g., multi-threading, parallel processing). When the trace is analyzed, the multiple applications can be recreated from a single scan of the trace data. This is useful in cases, for example, where in a problem determination or service scenario it is desired to recreate the circumstances in which an application failure occurred. For example, if a failure occurs for application A but it only occurs when application B is running in parallel, then recreating versions of application A and application B from the same trace allows more comprehensive diagnosis of application A. When attempting to recreate the failure, the recreated versions of both applications A and B can be executed in the same way that they were originally. The recreated applications may be restarted in the correct sequence in order to try and mirror any errors due to timing between their interactions.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements. Though the invention has been described with reference to certain versions thereof; however, other versions are possible. Therefore, the spirit and scope of the appended claims should not be limited to the description of the preferred versions contained herein.

Figure 4:
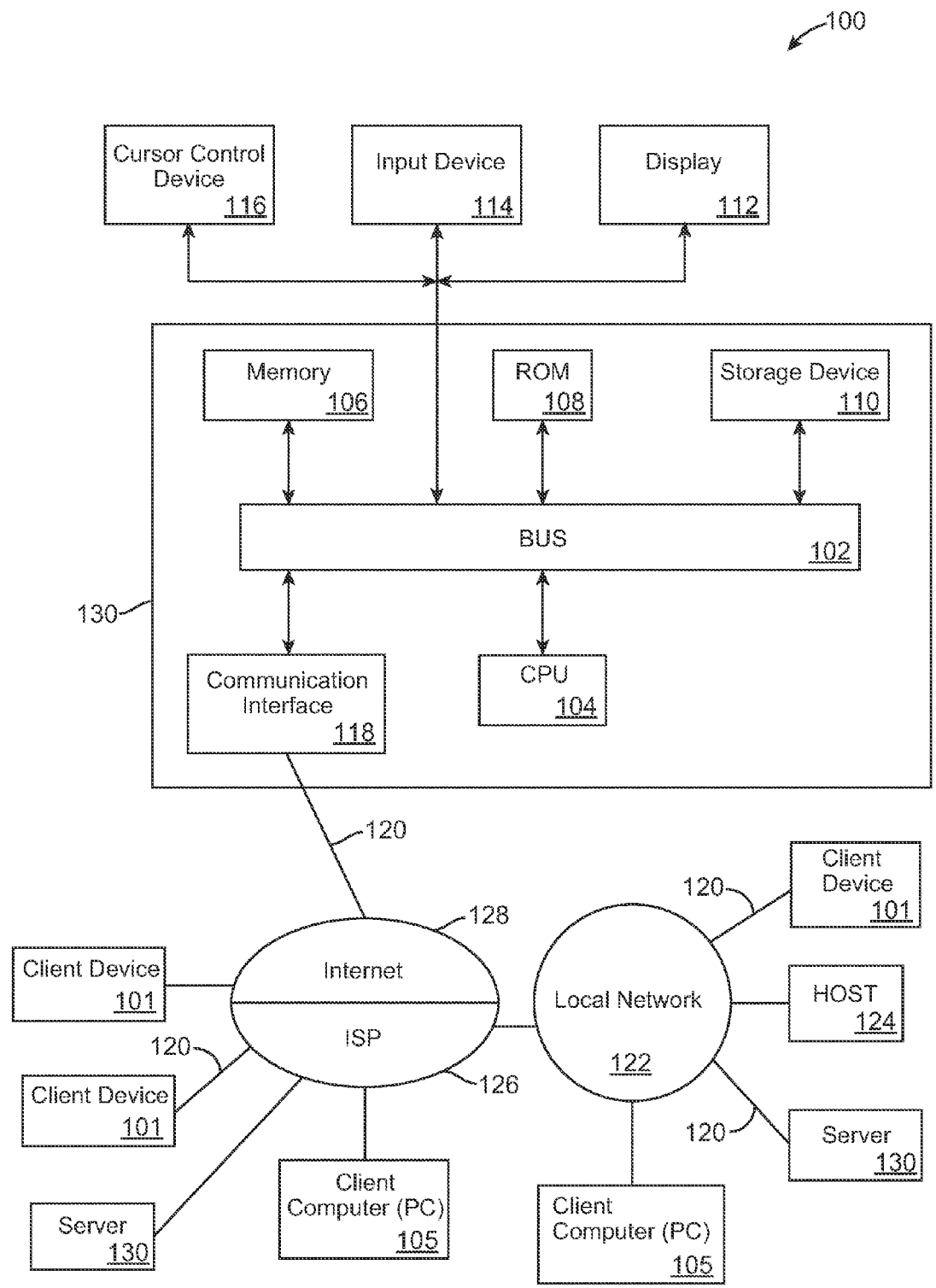
FIG. 4 shows a functional block diagram of a system which implements an embodiment of the invention.

FIG. 4 shows a block diagram of an example architecture of an embodiment of a system 100 configured as above, according to an embodiment of the invention. The system 100 includes one or more client devices 101 connected to one or more server computing systems 130. A server 130 includes a bus 102 or other communication mechanism for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type or user input device comprises cursor control 116, such as a mouse, a trackball, or cursor direction keys for communicating direction information and command selections to the processor 104 and for controlling cursor movement on the display 112.

According to one embodiment of the invention, the functions of the system 10 (FIG. 1) are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a non-transitory state medium such as a network link and/or a network interface, including a wired network that allows a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 104 for execution. Such a medium may take many forms, including but not limited to, non-volatile media and volatile media. Non-volatile media includes, for example, optical or magnetic disks, such as the storage device 110. Volatile media includes dynamic memory, such as the main memory 106.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a local network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of software application recreation in a computing environment, comprising, employing a processor for:
analyzing program execution diagnostic trace data of a software application to generate analysis results;
based on the analysis results, recreating program source code representing interactions from the software application based on the analysis results of data traced at selected points during the software application execution, and for generating a new executable version of the software application from the data traced at selected points during execution of the software application execution, wherein the recreated executable version of the software application programmatically behaves essentially similarly to the software application; and
creating white space code to simulate the software application execution timing by replacing business logic code of the software application with white space code in the executable version based on a diagnostic trace analysis, wherein the white space code comprises instructions to simulate program instructions of the software application in the new executable version of the software application.

2. The method of claim 1 further comprising:
generating the program execution diagnostic trace data for the software application;
wherein analyzing program execution diagnostic trace data of the software application further comprises programmatically analyzing program execution diagnostic trace data of the software application for selected significant operations.

3. The method of claim 2 further comprising detecting at least one of the actual time difference and processor consumption between the significant operations, from the program execution diagnostic trace data.

4. The method of claim 3, wherein recreating an executable version of the software application further comprises creating the white space code to replace the logic code of the software application to simulate the software application execution timing within the recreated version of the software application, wherein the white space code comprises instructions to simulate program instructions of the software application in the new executable version of the software application for simulating system behavior and effect on system central processing unit (CPU) and memory resources.

5. The method of claim 2 further comprising:
generating program execution diagnostic trace data for multiple software applications running essentially in parallel;
analyzing the program execution diagnostic trace data of the multiple software applications; and
using the analysis results in recreating an executable version of each of the software application from the program execution diagnostic trace data that is traced at significant points during execution of each software application of the multiple software applications.

6. The method of claim 2, wherein generating the program execution diagnostic trace data comprises capturing execution information when the software application makes function calls, wherein the program execution diagnostic trace data comprises one or more of: type of call, data involved in the function calls, parameters and user identification.

* * * * *